(12) United States Patent
Zhang (10) Patent No.: US 10,906,059 B2
(45) Date of Patent: Feb. 2, 2021

(54) SPRAYER WITH SELF-CLEANING FUNCTION

(71) Applicant: SUZHOU CROSSTEC CO., LTD., Suzhou (CN)

(72) Inventor: Xiaobing Zhang, Suzhou (CN)

(73) Assignee: SUZHOU CROSSTEC CO., LTD., Suzhou (CN)

( * ) Notice: Subject to any disclaimer, the term of this patent is extended or adjusted under 35 U.S.C. 154(b) by 0 days.

(21) Appl. No.: 16/667,834

(22) Filed: Oct. 29, 2019

(65) Prior Publication Data

US 2021/0001364 A1  Jan. 7, 2021

(30) Foreign Application Priority Data

Jul. 4, 2019 (CN) .......................... 2019 1 0596772

(51) Int. Cl.
*B05B 15/55* (2018.01)
*B05B 13/00* (2006.01)

(52) U.S. Cl.
CPC ............ *B05B 15/55* (2018.02); *B05B 13/005* (2013.01)

(58) Field of Classification Search
CPC . B05B 15/55; B05B 11/3066; B05B 11/3081; B05B 13/005; B05B 7/26; B05B 7/28; B05B 7/2405; B05B 7/2464; B05B 7/2472; B05B 7/2483; B05B 7/2486; B67D 7/007
USPC ...... 222/148, 251–415, 63, 129.2, 204, 416; 137/893
See application file for complete search history.

(56) References Cited

U.S. PATENT DOCUMENTS

| | | | | | |
|---|---|---|---|---|---|
| 2,537,266 | A | * | 1/1951 | Granberg .................. | B64F 1/28 222/318 |
| 3,140,011 | A | * | 7/1964 | Powers .................... | B08B 3/026 222/25 |
| 3,375,980 | A | * | 4/1968 | Hinrichs ................. | B05B 12/00 239/411 |
| 3,499,606 | A | * | 3/1970 | Ward ........................ | B05B 9/04 239/304 |
| 3,575,348 | A | * | 4/1971 | MacKay ................... | A47L 1/02 239/127 |
| 3,756,466 | A | * | 9/1973 | Haase ...................... | B60S 3/044 222/63 |
| 3,760,982 | A | * | 9/1973 | Haase ...................... | B60S 3/044 222/63 |
| 3,893,591 | A | * | 7/1975 | Hockmuth ............ | F16K 31/365 222/1 |
| 3,913,606 | A | * | 10/1975 | Anderson, Jr. ........... | F04F 3/00 137/205 |
| 3,997,080 | A | * | 12/1976 | Langstroth ............. | A45D 27/10 222/61 |
| 4,070,003 | A | * | 1/1978 | Shames ................... | F16L 37/22 251/149.6 |

(Continued)

*Primary Examiner* — Michael J. Melaragno
(74) *Attorney, Agent, or Firm* — SZDC Law P.C.

(57) ABSTRACT

The present invention discloses a sprayer with self-cleaning function, which includes a tank, a water pump, and a spray device; the water pump, used for conveying the liquid chemical from the tank to the spray device, is provided at its water inlet end with a pipeline switching mechanism to realize the switching between the liquid chemical supply and the water supply. The sprayer with self-cleaning function provided by the present invention is convenient for cleaning the sprayer, prolonging the life of the sprayer.

8 Claims, 10 Drawing Sheets

(56) References Cited

U.S. PATENT DOCUMENTS

| | | | |
|---|---|---|---|
| 4,349,157 A * | 9/1982 | Beiswenger | A01C 23/042 239/318 |
| 4,369,921 A * | 1/1983 | Beiswenger | B05B 7/2443 239/317 |
| 4,583,711 A * | 4/1986 | Johnson | F16L 37/23 137/614 |
| 4,660,803 A * | 4/1987 | Johnston | F16L 37/0985 137/533.17 |
| 4,913,345 A * | 4/1990 | Setter | A01M 7/0042 239/127 |
| 5,314,120 A * | 5/1994 | Nau | B05B 7/2486 239/155 |
| 5,427,151 A * | 6/1995 | Pauley | B01F 5/0077 137/505.25 |
| 5,450,881 A * | 9/1995 | Patterson | A01M 7/0092 137/202 |
| 5,529,460 A * | 6/1996 | Eihusen | B08B 3/026 417/20 |
| 5,944,056 A * | 8/1999 | Miyazoe | F16K 27/003 137/625.64 |
| 6,409,375 B1 * | 6/2002 | Knight | A01M 7/0092 366/136 |
| 6,450,545 B1 * | 9/2002 | LeMay | F16L 37/088 285/316 |
| 6,682,106 B2 * | 1/2004 | Parker | F16L 37/23 285/277 |
| 6,761,135 B1 * | 7/2004 | Becktold | B08B 3/026 122/396 |
| 7,083,120 B2 * | 8/2006 | Gilpatrick | B08B 3/026 239/390 |
| 7,530,605 B2 * | 5/2009 | Rigollet | F16L 37/144 285/305 |
| 7,841,351 B1 * | 11/2010 | Kane | B08B 3/02 134/172 |
| 8,459,506 B2 * | 6/2013 | Schiller | B01F 15/00149 222/145.5 |
| 8,496,188 B2 * | 7/2013 | Linton | F04B 17/06 239/124 |
| 8,783,587 B2 * | 7/2014 | Bearup | B05B 9/007 239/722 |
| 8,813,789 B2 * | 8/2014 | Dalhart, Sr. | B01F 5/0413 137/892 |
| 9,126,209 B2 * | 9/2015 | Wolfgram | B05B 7/2443 |
| 9,505,037 B2 * | 11/2016 | Kane | F28G 9/00 |
| 10,464,087 B2 * | 11/2019 | Allis | A01M 7/0032 |
| 2004/0173271 A1 * | 9/2004 | Nance | B05B 7/30 137/895 |
| 2005/0145270 A1 * | 7/2005 | Ray | B05B 9/007 134/174 |
| 2005/0217708 A1 * | 10/2005 | Otterson | E01H 1/101 134/34 |
| 2006/0048820 A1 * | 3/2006 | Horner | B08B 3/026 137/382 |
| 2006/0076776 A1 * | 4/2006 | Beeren | F16L 37/144 285/374 |
| 2006/0213565 A1 * | 9/2006 | Steingass | B01F 5/0413 137/893 |
| 2006/0214420 A1 * | 9/2006 | Mori | F02M 35/10144 285/319 |
| 2007/0273150 A1 * | 11/2007 | Tsurumi | F16L 37/144 285/305 |
| 2008/0061166 A1 * | 3/2008 | Jacques | B05B 7/0037 239/373 |
| 2009/0079188 A1 * | 3/2009 | Mitsui | F16B 39/20 285/305 |
| 2011/0079659 A1 * | 4/2011 | Wilken | A01M 7/0042 239/73 |
| 2011/0142685 A1 * | 6/2011 | Gilpatrick | F04B 49/20 417/34 |
| 2013/0069361 A1 * | 3/2013 | Cai | F16L 37/0925 285/133.21 |
| 2013/0087175 A1 * | 4/2013 | Petter | B08B 3/003 134/36 |
| 2013/0140808 A1 * | 6/2013 | Bongiorni | F16L 21/08 285/81 |
| 2013/0320667 A1 * | 12/2013 | Cai | F16L 37/0925 285/133.21 |
| 2014/0210204 A1 * | 7/2014 | Nishino | F16L 37/1225 285/319 |
| 2015/0338001 A1 * | 11/2015 | Bush | F16L 21/06 285/179 |
| 2015/0354736 A1 * | 12/2015 | Krupa | F16L 13/02 285/288.5 |
| 2018/0154386 A1 * | 6/2018 | Zhang | H01M 2/1022 |
| 2019/0105675 A1 * | 4/2019 | Allis | B05B 1/3013 |
| 2019/0210074 A1 * | 7/2019 | Chen | B05B 9/01 |
| 2020/0238316 A1 * | 7/2020 | Zhang | B05B 9/01 |

* cited by examiner

SPRAYER WITH SELF-CLEANING FUNCTION

This application claims the priority benefit of China Patent Application No. 201910596772.9 filed on Jul. 4, 2019, and entitled "Sprayer with self-cleaning function" which is incorporated by reference in its entirety.

TECHNICAL FIELD

The present invention relates to the field of sprayer and cleaning device technology, in particular to a sprayer with self-cleaning function.

BACKGROUND

A sprayer generally comprises a tank, a water pump and a spray device, with the inlet of the water pump connected to the tank to convey the liquid chemical from the tank to the spray device (spray gun). At present, there is no sprayer on the market that can realize self-cleaning function, mainly because the inlet of the pump can only be directly connected with the tank, and it is not easy to switch between water and the liquid chemical in the tank at any time. In most cases, users will not be able to spray pesticides or insecticides completely at one time, and basically there will be half a barrel or part of the liquid chemical left.

If the remaining liquid chemical is not disposed of in time, the parts of the sprayer that have touched the liquid chemical, such as the spray gun, the water pipe and the water pump, will not be able to get cleaned. Long-term storage of the liquid chemical causes the liquid chemical to damage the machine, resulting in a short life of the sprayer. Generally, the service life of the sprayer on the market is about one year. However, it is inconvenient that the remaining liquid chemical is poured out and stored separately in other separate containers, and then the members of the sprayer are cleaned with water to drain the remaining corrosive liquid chemical in time.

SUMMARY

An object of the present invention is to provide a sprayer with self-cleaning function, which has a simple structure and convenient operation.

In view of the above problems, the present invention provides a technical solution as follows:

A sprayer with self-cleaning function is provided, comprising a tank, a water pump, and a spray device, the water pump used for conveying liquid chemical from the tank to the spray device, the water pump being provided at its water inlet end with a pipeline switching mechanism to realize the switching between the liquid chemical supply and the water supply.

In some embodiments, the pipeline switching mechanism comprises a water pump inlet pipe, a liquid chemical inlet pipe, a water inlet pipe, and a three-way valve; the water pump inlet pipe is connected at one end to a water inlet of the water pump and at the other end to a water outlet of the three-way valve; the liquid chemical inlet pipe is connected at one end to the tank and at the other end to a first water inlet of the three-way valve; the water inlet pipe is connected at one end to a water storage device and at the other end to a second water inlet of the three-way valve; and the three-way valve is used to control the water pump inlet pipe to get in/out of communication with the liquid chemical inlet pipe or the water inlet pipe.

In some embodiments, the three-way valve is a three-way ball valve comprising a valve body and a ball spool rotatably disposed in the valve body; the valve body has the first water inlet, the second water inlet, the water outlet and a ball valve chamber, with the spool disposed within the ball valve chamber; the first water inlet extends to the ball valve chamber to form a first water inlet passage, the second water inlet extends to the ball valve chamber to form a second water inlet passage, and the water outlet extends to the ball valve chamber to form a water outlet passage; a T-shaped medium passage is disposed in the ball spool; the tank is provided with a limit mechanism for rotating the three-way ball valve within a range of ninety degrees, so as to rotate the ball spool to get the first water inlet passage or the second water inlet passage in communication with the water outlet passage.

In some embodiments, the valve body is provided outside with an operating handle connected to the ball spool.

In some embodiments, the tank is provided with a mount for mounting the water pump, the pipeline switching mechanism being disposed on the mount, the operating handle extending to the outer wall of the mount.

In some embodiments, the limit mechanism comprises a limit block and a limit slot disposed thereon, with the operating handle rotatable inside the limit slot within a range of ninety degrees.

In some embodiments, the limit slot is formed by two straight side walls perpendicular to each other and arc-shaped side edges connecting the two straight side walls; limit bosses are respectively disposed on the two straight side walls, with the operating handle rotatably limited between the two limit bosses.

In some embodiments, the mount comprises a recess extending inwardly from the outer surface of the tank, and a cover plate covering the recess.

In some embodiments, the second water inlet is connected via a connecting pipe to a fast-connection stop valve, which is fixed on the outer wall of the mount; the water inlet pipe is provided at the end with a fast-connection joint connected to the fast-connection stop valve.

In some embodiments, a plurality of seal rings are disposed between the ball spool and the inner wall of the ball valve chamber.

In some embodiments, the first water inlet is provided with a first joint for connecting the liquid chemical inlet pipe, the second water inlet is provided with a second joint for connecting the water inlet pipe, and the water outlet is provided with a third joint for connecting the water pump inlet pipe.

In some embodiments, the first joint, the second joint and the third joint are respectively fixed to the valve body via a U-shaped pin.

In some embodiments, the pipeline switching mechanism comprises a water pump inlet pipe, a liquid chemical inlet pipe, a water inlet pipe, a tee joint, a first switch member disposed in the liquid chemical inlet direction, and a second switch member disposed in the water inlet direction, with the water pump inlet pipe, the liquid chemical inlet pipe and the water inlet pipe respectively connected to the three ports of the tee joint.

In some embodiments, the first switch member, which is a switch valve, is mounted on a first end of the tee joint, with the port of the outer end of the first end connected to the liquid chemical inlet pipe; the second switch member, which is the fast-connection stop valve, is mounted on the port of the second end of the tee joint; the water pump inlet pipe is connected to the port of a third end of the tee joint; and the water inlet pipe is detachably connected to the fast-connection stop valve via the fast-connection joint.

In some embodiments, the first switch member and the second switch member are both switch valves.

Compared with the prior art, the present invention has the following advantages:

According to the technical solution of the present invention, a pipeline switching mechanism at the water inlet end of the water pump can be used to switch between the liquid chemical supply and the water supply. When the spray is completed, the water supply can be achieved by switching, so that the water pump is connected to the external water storage device to clean with water the residual liquid chemical in the pump, the water pipe, the spray gun and other parts. The unused liquid chemical in the tank can continue to be stored in the tank for next use, avoiding waste of the liquid chemical, environmental pollution, and other problems.

BRIEF DESCRIPTION OF DRAWINGS

In order to illustrate the technical solutions of the examples of the present invention more clearly, the drawings to be used in the description of the examples will be briefly described below. The drawings in the following description are only some examples of the present invention, and those skilled in the art can obtain other drawings based on these drawings without making any creative effort.

LIST OF REFERENCE NUMBERS

1. Tank; 1-1. mount; 1-1a. recess; 1-1b. cover plate;
2. water pump;
3. spray device;
4. water pump inlet pipe;
5. liquid chemical inlet pipe;
6. water inlet pipe;
7. three-way valve; 7-1. first water inlet; 7-2. second water inlet; 7-3. water outlet; 7-4. ball valve chamber; 7-5. ball spool; 7-5a. medium passage; 7-6. first water inlet passage; 7-7. second water inlet passage; 7-8. water outlet passage; 7-9. seal ring; 7-10. first joint; 7-11 second joint; 7-12. third joint; 7-13. operating handle; 7-14. valve body; 7-15. U-shaped pin;
8. connecting pipe;
9. fast-connection stop valve; 9-1. first valve body; 9-1a. limit boss; 9-2. first valve chamber; 9-3. first spool; 9-3a. liquid inlet passage; 9-3b. limit portion; 9-4. compression spring; 9-5. seal ring;
10. water storage device;
11. fast-connection joint;
12. limit mechanism; 12-1. limit block; 12-2. limit slot; 12-3. limit boss;
13. tee joint; 13-1. first end; 13-2. second end; 13-3. third end;
14. switch valve; 14-1. second valve body; 14-2. second valve chamber; 14-3. second spool; 14-3a. liquid passage.

DETAILED DESCRIPTION OF PREFERRED EMBODIMENTS

The above solution will be further described below with reference to specific examples. It is to be understood that these examples are intended to illustrate the present invention without limiting the scope thereof. The implementation conditions employed in the examples can be further adjusted according to the conditions of the specific manufacturer, with the unspecified implementation conditions being usually those in the conventional experiment.

As shown in FIGS. 1-4 that are schematic structural views of Example 1 of the present invention, a sprayer with self-cleaning function is provided, comprising a tank 1, a water pump 2, and a spray device 3; the water pump 2 has its water inlet connected to the tank 1 and its water outlet connected to the spray device 3 via the water outlet pipe, so as to convey the liquid chemical from the tank 1 to the spray device 3, which is a spray gun.

In order to clean the water pump 2, the water pipe and the spray gun at the end of the spray, a pipeline switching mechanism is provided at the water inlet end of the water pump 2 to switch between the liquid chemical supply and the external water supply.

Specifically, the pipeline switching mechanism comprises a water pump inlet pipe 4, a liquid chemical inlet pipe 5, a water inlet pipe 6, and a three-way valve 7; the water pump inlet pipe 4 is connected at one end to a water inlet of the water pump 2 and at the other end to a water outlet of the three-way valve 7; the liquid chemical inlet pipe 5 is connected at one end to the tank 1 and at the other end to a first water inlet 7-1 of the three-way valve 7; the water inlet pipe 6 is connected at one end to a water storage device 10 (e.g. a barrel) and at the other end to a second water inlet 7-2 of the three-way valve 7; and the three-way valve 7 is used to control the water pump inlet pipe 4 to get in/out of communication with the liquid chemical inlet pipe 5 or the water inlet pipe 6.

In this example, the three-way valve 7 is a three-way ball valve comprising a valve body 7-14 and a ball spool 7-5 rotatably disposed in the valve body 7-14; the valve body 7-14 has the first water inlet 7-1, the second water inlet 7-2, the water outlet 7-3 and a ball valve chamber 7-4, with the ball spool 7-5 disposed within the ball valve chamber 7-4; the first water inlet 7-1 extends to the ball valve chamber 7-4 to form a first water inlet passage 7-6, the second water inlet 7-2 extends to the ball valve chamber 7-4 to form a second water inlet passage 7-7, and the water outlet 7-3 extends to the ball valve chamber 7-4 to form a water outlet passage 7-8; a T-shaped medium passage 7-5*a* is disposed in the ball spool 7-5; the tank 1 is provided with a limit mechanism 12 for rotating the three-way ball valve within a range of ninety degrees, so as to rotate the ball spool 7-5 to get the first water inlet passage 7-6 in communication with the water outlet passage 7-8, when the second water inlet passage 7-7 is not in communication with the water outlet passage 7-8; then the ball spool 7-5 is rotated ninety degrees to get the second water inlet passage 7-7 in communication with the water outlet passage 7-8, when the first water inlet passage 7-6 is not in communication with the water outlet passage 7-8; a plurality of seal rings 7-9 are disposed between the ball spool 7-5 and the inner wall of the ball valve chamber 7-4.

Figure 1:
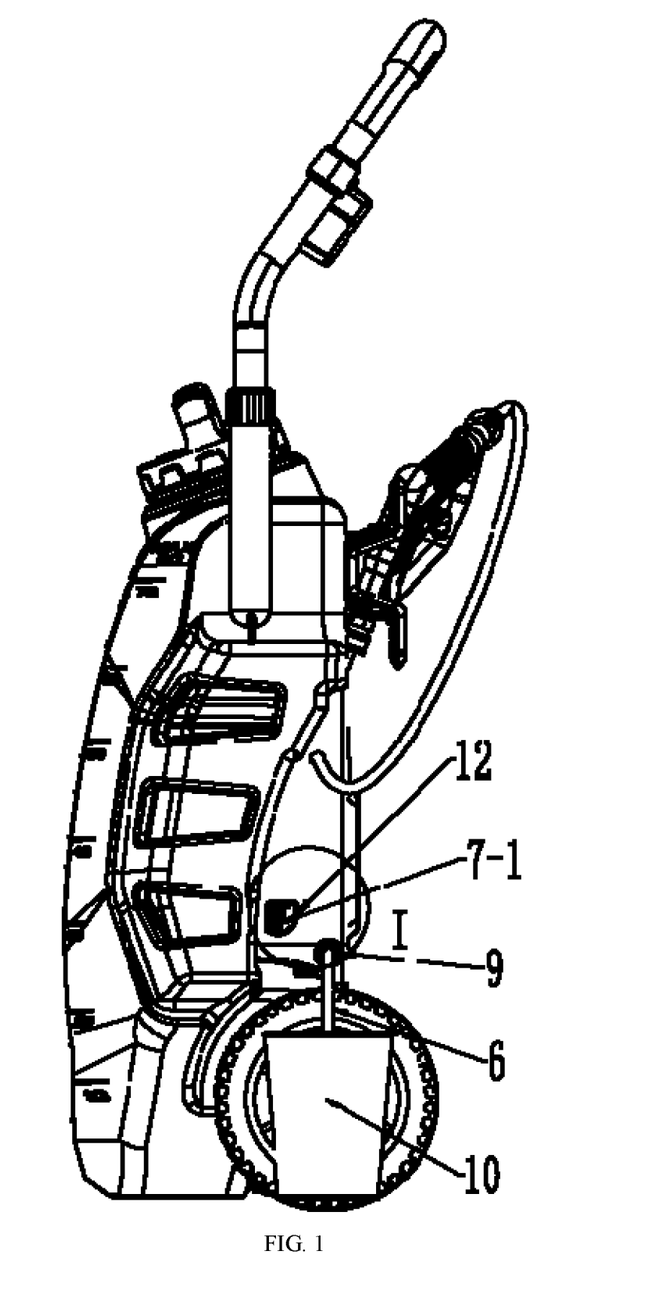
FIG. 1 is a schematic structural view of the sprayer with self-cleaning function according to Example 1 of the present invention.
Figure 2:
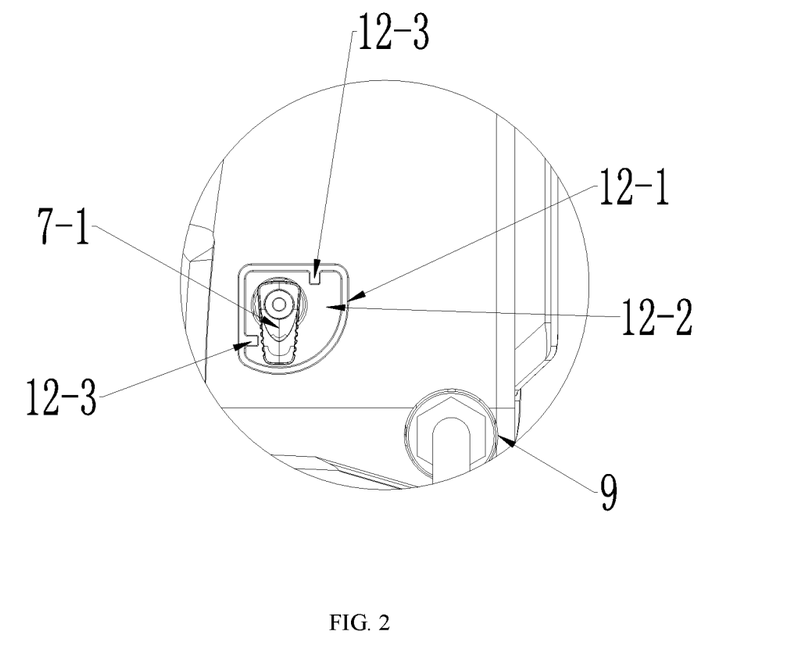
FIG. 2 is a partial enlarged view of the position I in FIG. 1.

Specifically, the limit mechanism 12 comprises a limit block 12-1 and a limit slot 12-2 disposed thereon, the operating handle 7-13 going through the limit block 12-1 to connect to the ball spool 7-5, the operating handle 7-13 being rotatable inside the limit slot 12-2 within a range of ninety degrees; the limit slot 12-2 is formed by two straight side walls perpendicular to each other and arc-shaped side edges connecting the two straight side walls; limit bosses 12-3 are respectively disposed on the two straight side walls, with the operating handle 7-13 rotatably limited between the two limit bosses 12-3.

Figure 5:
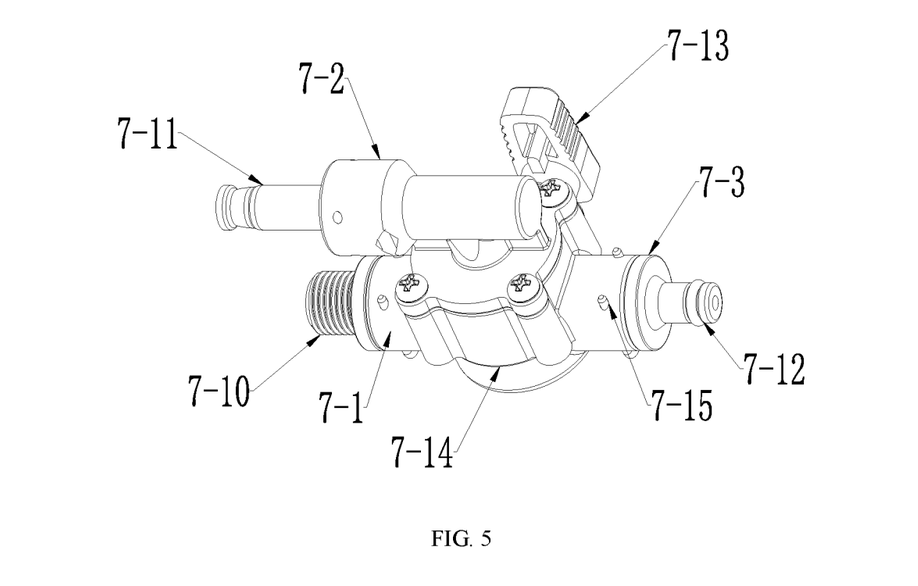
FIG. 5 is a schematic structural view of a three-way valve according to Example 1 of the present invention.
Figure 6:
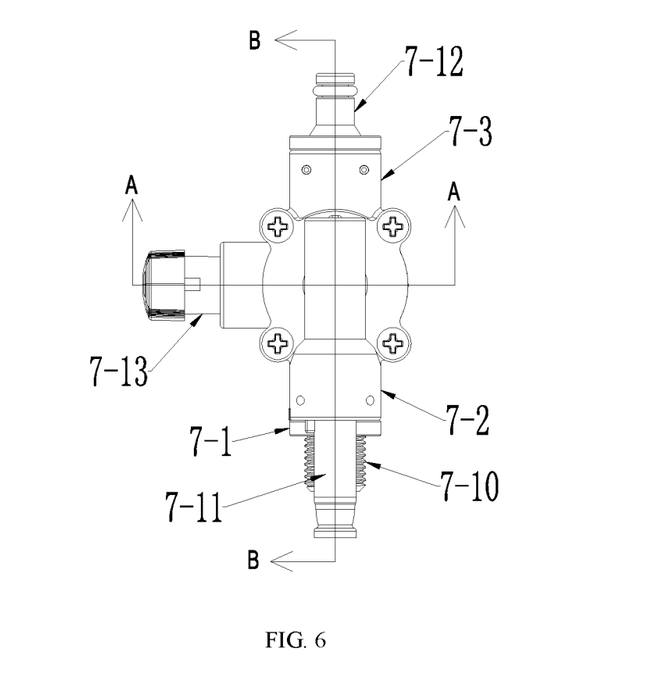
FIG. 6 is a schematic structural view of the three-way valve in another direction according to Example 1 of the present invention.
Figure 7:
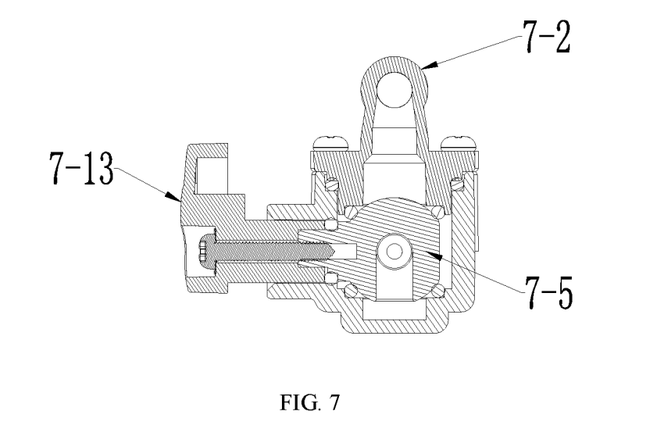
FIG. 7 is a cross-sectional view taken along the line A-A in FIG. 6.
Figure 8:
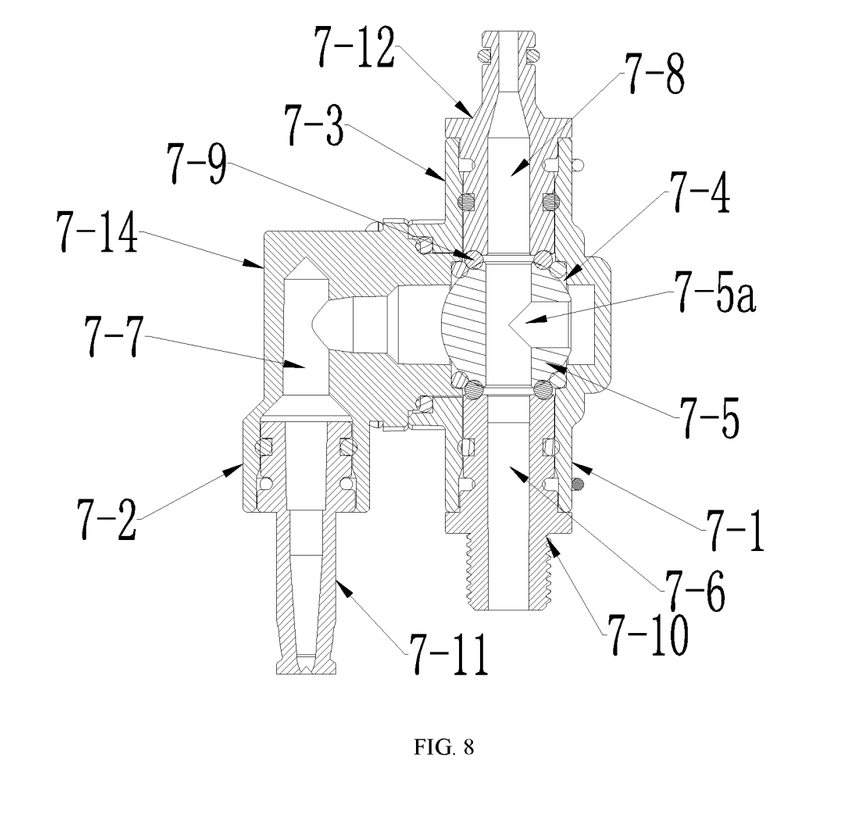
FIG. 8 is a cross-sectional view taken along the line B-B in FIG. 6.

In order to facilitate the operation of the three-way valve 7, an operating handle 7-13 connected to the ball spool 7-5 is provided outside the valve body 7-14.

Figure 3:
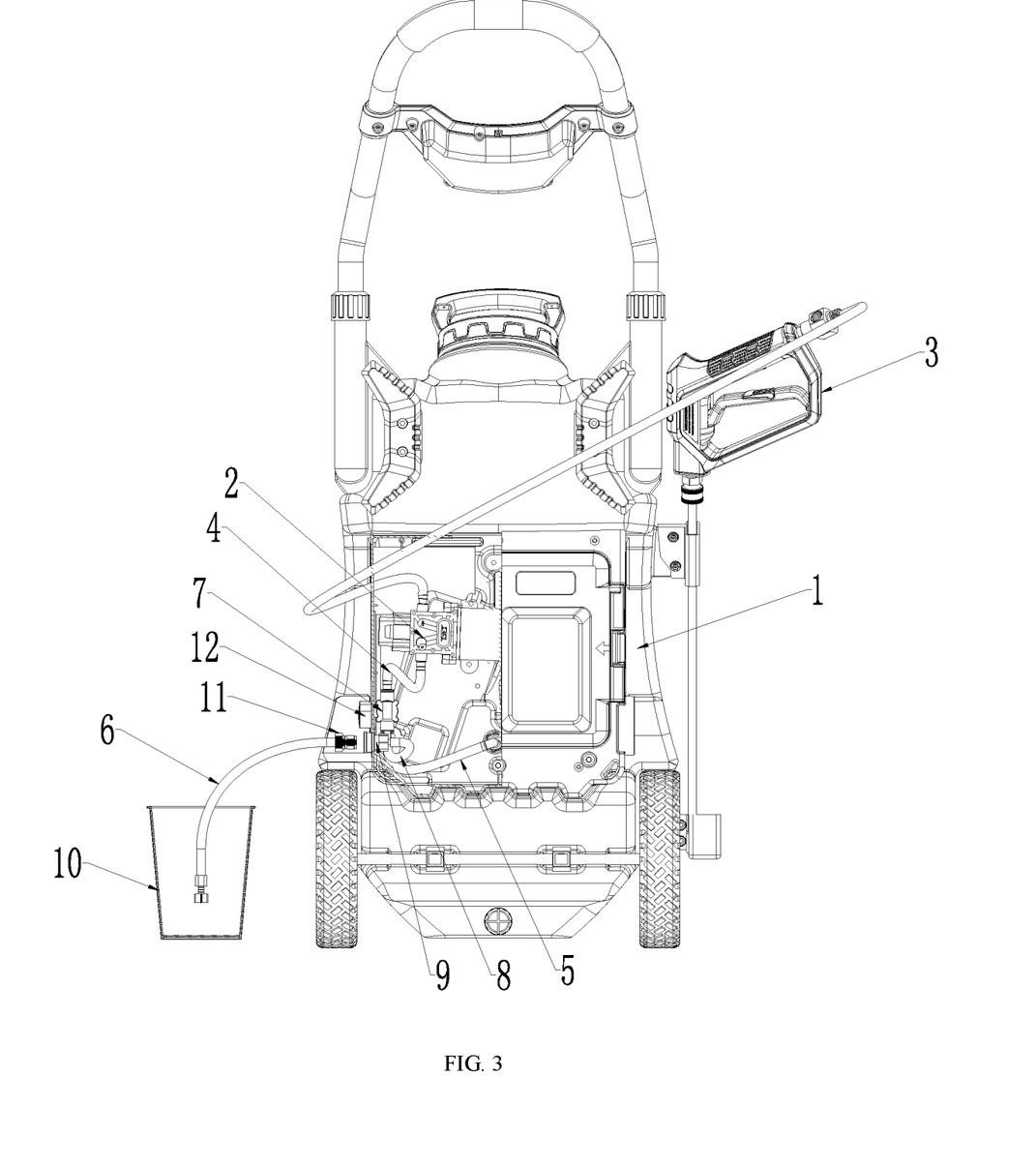
FIG. 3 is a cross-sectional view showing a part of the structure according to Example 1 of the present invention.
Figure 4:
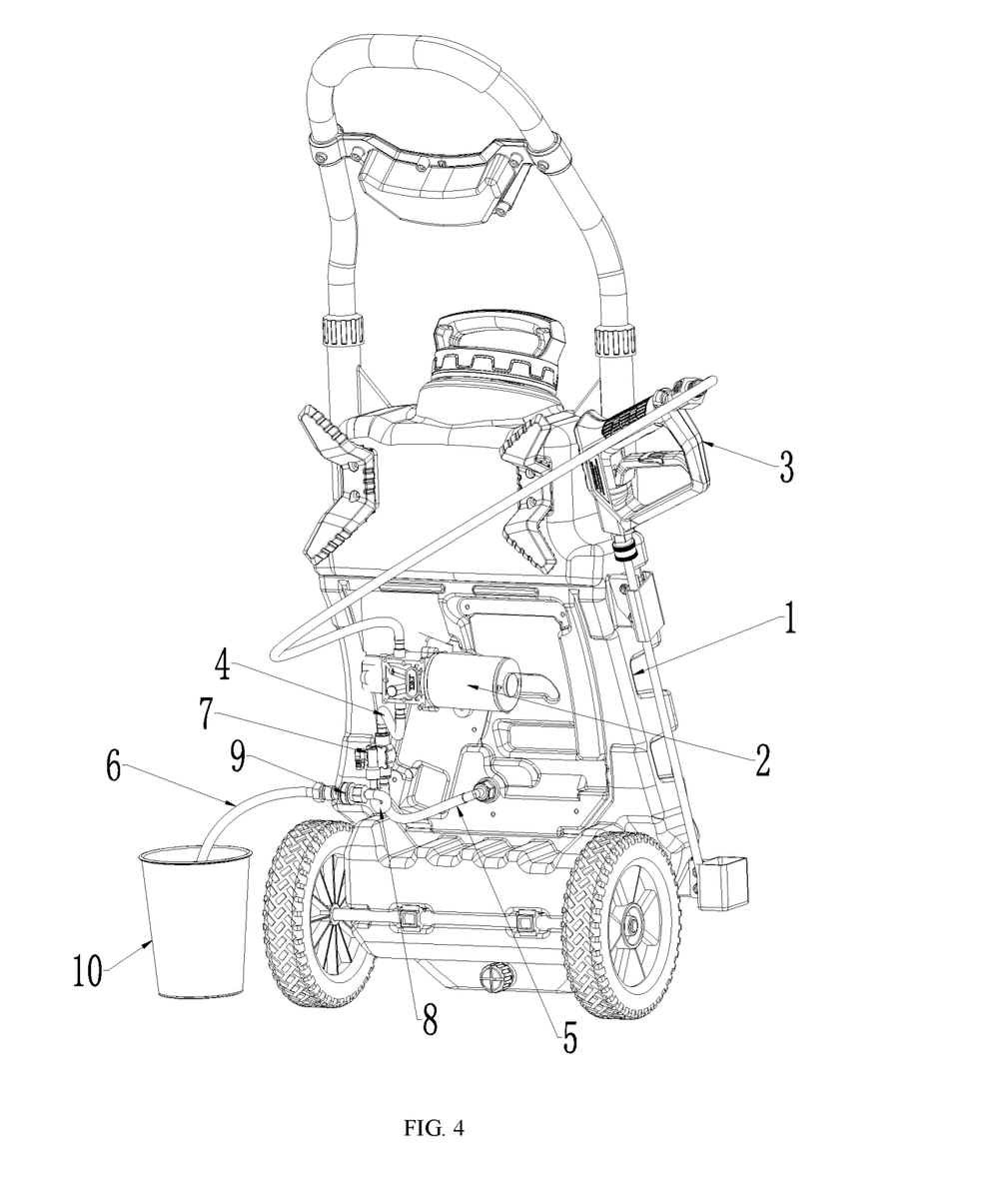
FIG. 4 is a schematic view showing the mounting structure of a pipeline switching mechanism according to Example 1 of the present invention.

The tank 1 is provided with a mount 1-1 for mounting the water pump 2, the mount 1-1 comprising a recess 1-1*a* extending inwardly from the outer surface of the tank 1, and a cover plate 1-1*b* covering the recess 1-1*a*. The pipeline switching mechanism is disposed on the mount 1-1, and the operating handle 7-13 extends to the outer wall of the mount 1-1, so as to facilitate the pipeline switching operation.

The second water inlet 7-2 is connected via a connecting pipe 8 to a fast-connection stop valve 9, which is fixed on the outer wall of the mount 1-1; the water inlet pipe 6 is provided at the end with a fast-connection joint 11 detachably connected to the fast-connection stop valve 9. The fast-connection stop valve 9 and the fast-connection joint 11 are of the prior art, and will not be described in detail in this example.

In order to facilitate the connection of the liquid chemical inlet pipe 5, the water inlet pipe 6 and the water pump inlet pipe 4, the first water inlet 7-1 is provided with a first joint 7-10 for connecting the liquid chemical inlet pipe 5, the second water inlet 7-2 is provided with a second joint 7-11 for connecting the water inlet pipe 6, and the water outlet 7-3 is provided with a third joint 7-12 for connecting the water pump inlet pipe 4; the first joint 7-10, the second joint 7-11 and the third joint 7-12 are respectively fixed to the valve body via a U-shaped pin 7-15.

Figure 9:
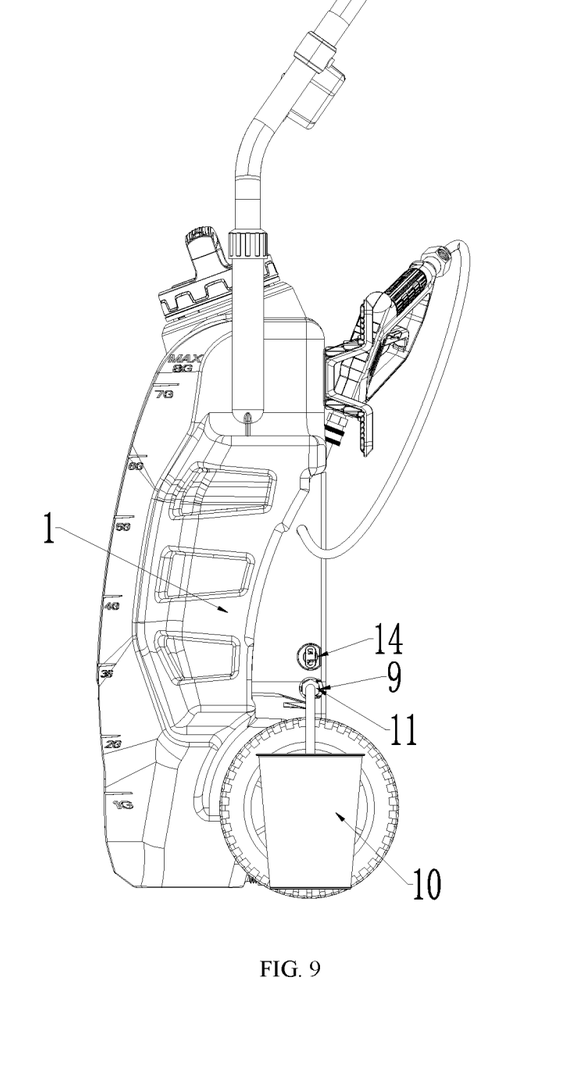
FIG. 9 is a schematic structural view of Example 2 of the present invention.
Figure 10:
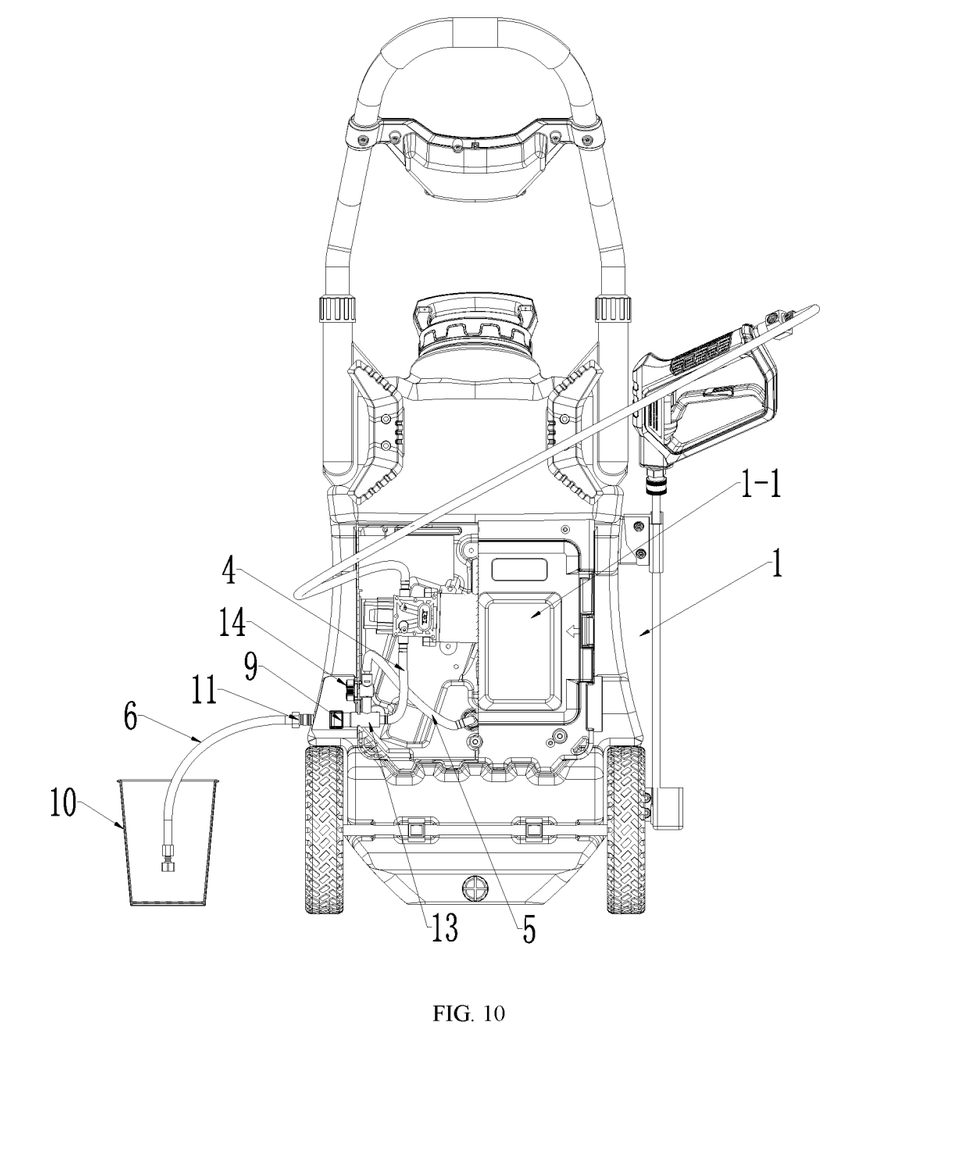
FIG. 10 is a partial cross-sectional view of Example 2 of the present invention.

In Example 2, as shown in FIGS. 9-10, the pipeline switching mechanism comprises a water pump inlet pipe 4, a liquid chemical inlet pipe 5, a water inlet pipe 6, a tee joint 13, a first switch member disposed in the liquid chemical inlet direction, and a second switch member disposed in the water inlet direction, with the water pump inlet pipe 4, the liquid chemical inlet pipe 5 and the water inlet pipe 6 respectively connected to the three ports of the tee joint 13. The first switch member and the second switch member are used to control opening and closing of the liquid chemical and water, thereby switching between the liquid chemical supply and the water supply. The pipeline switching mechanism is mounted on the mount 1-1.

Figure 11:
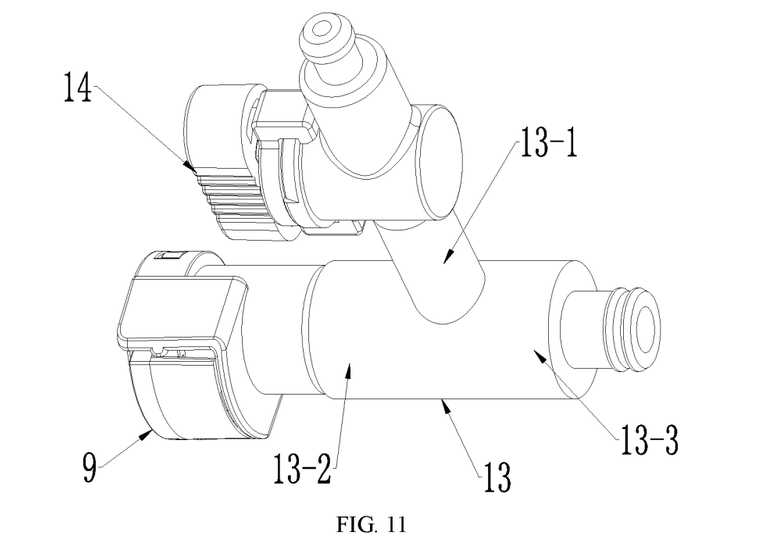
FIG. 11 is a schematic view showing the installation of a tee joint, a switch valve and a fast-connection stop valve according to Example 2 of the present invention.
Figure 13:
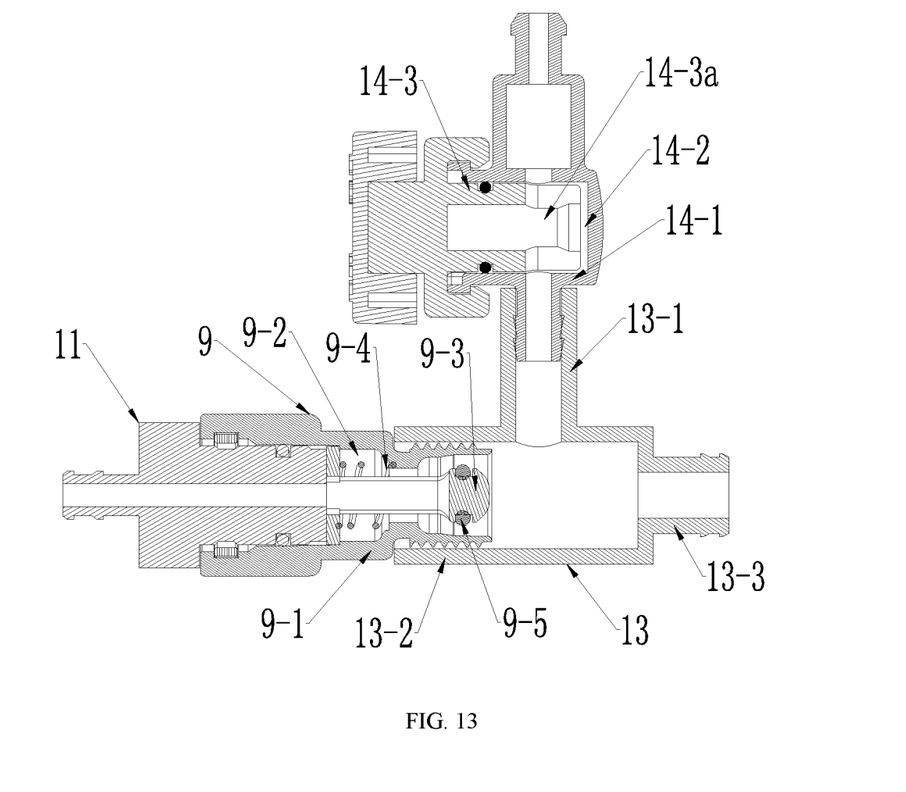
FIG. 13 is a schematic structural view showing the connection of a stop valve and a fast-connection joint in Example 2 of the present invention.

As shown in FIG. 11, the first switch member, which is a switch valve 14, is mounted on a first end 13-1 of the tee joint 13, with the port of the outer end of the first end 13-1 connected to the liquid chemical inlet pipe 5; the second switch member, which is the fast-connection stop valve 9, is mounted on the port of the second end 13-2 of the tee joint 13; the water pump inlet pipe 4 is connected to the port of a third end 13-3 of the tee joint 13; the switch valve 14 and the fast-connection stop valve 9 are fixed on the outer wall of the tank 1; the water inlet pipe 6 is provided at the end with a fast-connection joint 11 detachably connected to the fast-connection stop valve 9. After spraying the liquid chemical is completed, the switch valve 14 is closed, as shown in FIG. 13, and the fast-connection joint 11 of the water inlet pipe 6 is connected to the fast-connection stop valve 9; then the water pump 2 is in communication with the water storage tank 10, so that water is conveyed to the inside of the spray device 3 to clean the members such as the water pump 2 and the pipes. It should be understood that a switch valve may also be used as the first switch member and the second switch member, so as to control opening and closing of the liquid chemical supply and the water supply, respectively.

In other embodiments, the first switch component may be disposed on the liquid chemical inlet pipe 5, and the second switch member may be disposed on the water inlet pipe 6, with a switch valve used as the first switch member and the second switch member.

Figure 12:
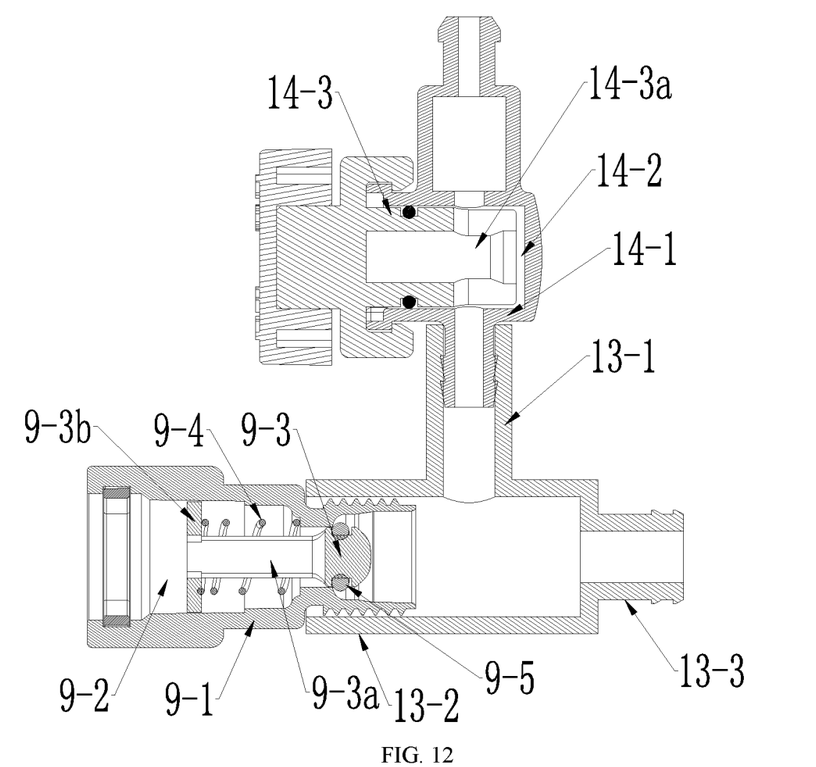
FIG. 12 is a schematic structural view of the tee joint, the switch valve and the fast-connection stop valve according to Example 2 of the present invention.

The fast-connection stop valve 9 comprises a first valve body 9-1, a first valve chamber 9-2 disposed in the first valve body 9-1, and a first spool 9-3 disposed in the first valve chamber 9-2. The first spool 9-3 is arranged along the axial direction of the first valve chamber 9-2, with its inner end sealingly engaged with a limit boss 9-1*a* on the inner wall of the first valve chamber 9-2. A seal ring 9-5 is fitted to the inner end of the first valve body 9-3 for sealing the limit boss 9-1*a*. A compression spring 9-4, sleeved on the first spool 9-3, has the inner end abutting against the limit boss 9-1*a* and the outer end abutting against the limit portion 9-3*b* at the outer end of the first spool 9-3. The first spool 9-3 has an inlet flow passage 9-3*a* arranged in the axial direction and closed at the inner end, and is provided on the outer wall with an opening in communication with the inlet flow passage 9-3*a*. When the fast-connection joint 11 is not connected to the fast-connection stop valve 9, the first spool 9-3 is sealingly engaged with the limit boss 9-1*a* by the compression spring 9-4, so as to make the opening of the inlet flow passage 9-3*a* located at the outer end of the first valve chamber 9-2. When the fast-connection joint 11 is connected to the fast-connection stop valve 9, the fast-connection joint 11 presses the compression spring 9-4, which makes the first spool 9-3 move inward and the opening of the inlet flow passage 9-3*a* located at the inner end of the first valve chamber 9-2, so that the inlet flow passage 9-3*a* communicates with the tee joint 13 and the water can enter the water pump inlet pipe 4 along the inlet flow passage 9-3*a*. The switch valve 14, being of the prior art, comprises a second valve body 14-1 fixed to the first end 13-1, a second valve chamber 14-2 disposed in the second valve body 14-1, and a second spool 14-3 rotatably disposed in the second valve chamber 14-2. The second valve body 14-1 is provided on the outer wall with two communication ports communicating with the first end 13-1, and the second spool 14-3 has a liquid passage 14-3*a* communicating with the two communication ports, with the second spool 14-3 rotated to get the liquid passage 14-3*a* in/out of communication with the two communication ports.

The example described above, instead of limiting the protection scope of the present invention, is only intended to illustrate the technical concept and features of the present invention and enable those skilled in the art to understand and implement the present invention. Any equivalent alteration or modification made according to the spiritual substance of the present invention is intended to fall within the scope of the present invention.

What is claimed is:

1. A sprayer with self-cleaning function, comprising a tank, a water pump, and a spray device, the water pump used for conveying liquid chemical from the tank to the spray device,
   wherein the water pump is provided at its water inlet end with a pipeline switching mechanism to realize the switching between the liquid chemical supply and a water supply;
   wherein the pipeline switching mechanism comprises a water pump inlet pipe, a liquid chemical inlet pipe, a water inlet pipe, and a three-way valve; the water pump inlet pipe is connected at one end to a water inlet of the water pump and at the other end to a water outlet of the three-way valve; the liquid chemical inlet pipe is connected at one end to the tank and at the other end to a first water inlet of the three-way valve; the water inlet pipe is connected at one end to a water storage device and at the other end to a second water inlet of the three-way valve; and the three-way valve is used to control the water pump inlet pipe to get in/out of communication with the liquid chemical inlet pipe or the water inlet pipe; and
   wherein the three-way valve is a three-way ball valve comprising a valve body and a ball spool rotatably disposed in the valve body; the valve body has the first water inlet, the second water inlet, the water outlet and a ball valve chamber, with the ball spool disposed within the ball valve chamber; the first water inlet extends to the ball valve chamber to form a first water inlet passage, the second water inlet extends to the ball valve chamber to form a second water inlet passage, and the water outlet extends to the ball valve chamber to form a water outlet passage; a T-shaped medium passage is disposed in the ball spool; the tank is provided with a limit mechanism for rotating the three-way ball valve within a range of ninety degrees, so as to rotate the ball spool to get the first water inlet passage or the second water inlet passage in communication with the water outlet passage.

2. The sprayer with self-cleaning function according to claim 1, wherein the valve body is provided outside with an operating handle connected to the ball spool; the tank is provided with a mount for mounting the water pump, the pipeline switching mechanism being disposed on the mount, the operating handle extending to an outer wall of the mount; the limit mechanism comprises a limit block and a limit slot disposed thereon, with the operating handle rotatable inside the limit slot within a range of ninety degrees.

3. The sprayer with self-cleaning function according to claim 2, wherein the limit slot is formed by two straight side walls perpendicular to each other and arc-shaped side edges connecting the two straight side walls; limit bosses are respectively disposed on the two straight side walls, with the operating handle rotatably limited between the two limit bosses.

4. The sprayer with self-cleaning function according to claim 2, wherein the second water inlet is connected via a connecting pipe to a fast-connection stop valve, which is fixed on the outer wall of the mount; the water inlet pipe is provided at the end with a fast-connection joint detachably connected to the fast-connection stop valve.

5. The sprayer with self-cleaning function according to any of claim 1, wherein the first water inlet is provided with a first joint for connecting the liquid chemical inlet pipe, the second water inlet is provided with a second joint for connecting the water inlet pipe, and the water outlet is provided with a third joint for connecting the water pump inlet pipe; the first joint, the second joint and the third joint are respectively fixed to the valve body via a U-shaped pin.

6. The sprayer with self-cleaning function according to claim 1, wherein the pipeline switching mechanism comprises a water pump inlet pipe, a liquid chemical inlet pipe, a water inlet pipe, a tee joint, a first switch member disposed in a liquid chemical inlet direction, and a second switch member disposed in a water inlet direction, with the water pump inlet pipe, the liquid chemical inlet pipe and the water inlet pipe respectively connected to the three ports of the tee joint.

7. The sprayer with self-cleaning function according to claim 6, wherein the first switch member, which is a switch valve, is mounted on a first end of the tee joint, with a port of an outer end of the first end connected to the liquid chemical inlet pipe; the second switch member, which is a fast-connection stop valve, is mounted on a port of a second end of the tee joint; the water pump inlet pipe is connected to a port of a third end of the tee joint; and the water inlet pipe is detachably connected to the fast-connection stop valve via a fast-connection joint.

8. The sprayer with self-cleaning function according to claim 6, wherein the first switch member and the second switch member are both switch valves.

\* \* \* \* \*